(12) United States Patent
Wache et al.

(10) Patent No.: US 6,241,026 B1
(45) Date of Patent: *Jun. 5, 2001

(54) ROTARY HAMMER

(75) Inventors: Robert Bernhard Wache, Wiesbaden; Manfred Droste, Limburg-Offheim, both of (DE)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/566,325

(22) Filed: May 8, 2000

(30) Foreign Application Priority Data

May 8, 1999 (GB) .................................................... 9910599

(51) Int. Cl.[7] .................................................... B23B 31/07
(52) U.S. Cl. ..................... 173/132; 279/19.5; 279/19.3; 279/75; 279/905
(58) Field of Search .................................. 173/114, 201, 173/132, 48; 279/19.3, 19.5, 19.6, 19.7, 75, 905, 19.4; 408/239 R

(56) References Cited

U.S. PATENT DOCUMENTS

| 4,502,824 | 3/1985 | Dohse et al. . | |
|---|---|---|---|
| 4,585,077 | 4/1986 | Bergler . | |
| 5,016,892 | 5/1991 | Lafforgue et al. . | |
| 5,088,566 | 2/1992 | Gustafsson et al. . | |
| 5,199,833 | * 4/1993 | Fehrle et al. | 279/19.3 |
| 5,409,243 | 4/1995 | Shadeck et al. . | |
| 5,437,465 | * 8/1995 | Vogele et al. | 279/75 |
| 5,465,983 | 11/1995 | Owens et al. . | |
| 5,466,101 | 11/1995 | Meyen . | |
| 5,601,149 | 2/1997 | Kawasaki et al. . | |
| 5,603,516 | * 2/1997 | Neumaier | 279/19.5 |
| 5,688,163 | 11/1997 | Sidén . | |
| 5,775,440 | 7/1998 | Shinma . | |
| 5,971,403 | * 10/1999 | Yahagi et al. | 279/905 |
| 5,996,708 | 12/1999 | Gerold . | |
| 6,073,705 | * 6/2000 | Shibata et al. | 173/48 |

FOREIGN PATENT DOCUMENTS

| 3506008 | 8/1992 | (DE) . |
|---|---|---|
| 4436860 | 4/1998 | (DE) . |
| 0548702 | 6/1993 | (EP) . |
| 0888851 | 6/1998 | (EP) . |
| 2171340 | 8/1986 | (GB) . |
| 9516531 | 6/1995 | (WO) . |
| 9516532 | 6/1995 | (WO) . |

* cited by examiner

*Primary Examiner*—Scott A. Smith
(74) *Attorney, Agent, or Firm*—Michael P. Leary; Bruce S. Shapiro

(57) ABSTRACT

A tool holder attachable to a spindle of a hammer and which can receive a bit, the bit having a shank with at least one retaining groove extending along part of the shank, the retaining groove having a defined length, a front end and a rear end that limit axial movement of the bit in the tool holder, which tool holder comprises a hollow cylinder having an axis, an axial bore, a rear end that can be attached to the spindle of the hammer, and a front end that can receive the shank of the bit so that the bit is slidable within the cylinder in an axial direction, at least one retaining element that is located so that it can extend radially into the bore of the cylinder and into the at least one retaining groove of the bit so that the retaining element can be hit by the rear end of the retaining groove during the transition to idling and limit the extent of axial movement of the bit within the cylinder, at least one radial restraining element limiting movement of the retaining element in the radial direction, at least one axial restraining block limiting movement of the retaining element in the axial direction, when hit by the retaining element the axial restraining block movable to a limited extent in the axial direction with respect to the radial restraining element, and a resilient element located forward of the axial restraining block and arranged so as to attenuate the impact transmitted through the axial restraining block from the retaining element.

15 Claims, 8 Drawing Sheets

ROTARY HAMMER

BACKGROUND OF INVENTION

This invention relates to rotary hammers and in particular to hammers that incorporate an air cushion hammering mechanism, and to tool holders for use in such hammers.

Such hammers will normally include a tool holder that can hold a hammer bit or chisel bit for acting on a workpiece, and an air cushion hammering mechanism which comprises a piston, a beat piece and normally also a ram that are slidably located in a spindle so that reciprocation of the piston in the spindle will cause the beat piece to hit the end of the bit located in the tool holder with a considerable force, thereby to cause the bit to impact the workpiece. Such hammers are well known, and are described, for example in EP-A-0 014 760, EP-A-0 429 475 and EP-A-0 759 341. The tool holders and the bits are arranged so that the bit is able to move to a limited extent in the axial direction under the force of the impact from the beat piece, and so chip at the workpiece. A number of designs have been proposed for the bits, and the particular design will depend, among other things, on the size of the hammer.

A tool bit design that has become extremely popular during the last few years is that described in DE-A-25 51 125. This form of bit is known under the designation "SDS Plus" and has a circular shank of approximately 10 mm diameter extending for approximately 50 mm (beyond which the diameter may increase or decrease depending on the design of the bit). The shank of the bit has a pair of driving grooves that extend in the axial direction to the rear end of the bit so that the bit shank can engage driving splines when the bit is inserted in the tool holder in order to enable the bit to be rotated instead of being impacted or in addition to being impacted as desired by the operator. The shank also contains a pair of axially extending retaining grooves, each being approximately 20 mm in length located toward the rear end of the shank (i.e. the end that is inserted in the tool holder), which grooves, or one of which grooves, receives a retaining element of the tool holder that extends radially into the bore of the cylinder. The retaining grooves each have closed ends, that is to say, the grooves do not extend to the rear end of the bit shank, so that the closed ends limit axial movement of the bit in the tool holder by hitting the retaining element(s) as the bit slides along the cylinder to its forward position. It is necessary to be able to retract the retaining elements so that they do not extend radially into the bore of the cylinder when the bit shank is inserted into the cylinder and removed from the cylinder. To this end, the tool holder is typically provided with a sleeve that is located on the outer surface of the tool holder and is axially slidable to a defined extent by the operator in order to present an internal recess to the retaining element(s) into which the retaining element(s) can move during insertion and extraction of the bit. In a typical tool holder design, the retaining element is in the form of one or more balls that extend into the bore of the cylinder by an amount that is less than the radius thereof, so that, once the recess has been presented to the retaining element, the retaining element can be pushed radially into the recess simply by insertion or extraction of the bit shank.

When the hammer is being operated to act on a workpiece, the impact of the beat piece on the bit is largely absorbed by the workpiece. However, when the hammer is removed from the workpiece by the operator, the beat piece will hit the bit one last time and knock the bit into the forwardmost position in the tool holder so that the hammer comes into so-called "idle mode" and the beat piece cannot hit it again until the operator re-engages the bit in the workpiece. When the bit is struck by the beat piece during this last impact, the bit is thrust rapidly forward until the rear end of one or more of the retaining grooves strikes the retaining element which arrests the forward motion of the bit by transferring its momentum to the rest of the tool holder. This is normally achieved by the retaining element striking a restraining element that is fixed in the tool holder.

It is now intended to employ bits of the type that have a shank with one or more retaining grooves, such as SDS Plus, in hammers larger than those in which they were originally employed, which generate larger impacts on the drill or chisel bit inserted in the tool holder, and/or to employ this type of coupling of the bit shank with bits of larger mass than before. This change has the problem that the magnitude of the reduction of momentum of the bit that is necessary after the last impact by the beat piece in order to bring the bit to rest in the tool holder is increased, with the result that the impact forces exerted on the retaining element by the rear end of the retaining groove of the bit are also increased, which can damage the components of the tool holder. The rear end configuration of the retaining groove of the bit is not, in fact "square" (i.e. normal to the bit shank axis) but instead is curved to form the arc of a circle in longitudinal cross-section. Furthermore, the retaining groove is relatively shallow, having a depth that is less than the radius of any spherical retaining element. This has the result that, when the rear end of the retaining groove of the bit hits the retaining element of the tool holder, the retaining element is forced both axially forwardly and radially outwardly.

The problem of damage to the tool holder caused by the impact of the retaining groove of the bit shank on the retaining element depends to a large extent on the distance that is available for the bit to decelerate to rest after having been hit by the beat piece. Thus, one solution would be to extend the length of the bit and the tool holder so that the rate of deceleration of the bit, and hence the force acting on the retaining element is reduced. However, such a solution is not possible without removing compatibility of the tool holder with existing designs of bits such as the SDS and SDS Plus bits which set the length of the bit shank and the retaining grooves used therein. The problem of the magnitude of the forces exerted on the retaining element by the rear end of the retaining groove of the bit shank is exacerbated by the fact that the retaining groove of the bit shank is relatively shallow, so that a force is generated in the radial direction that can be significantly larger than the force exerted by the rear end of the retaining groove in the axial direction.

The Bosch GSH 10 and Hilti TE 905 tool holder designs employ retaining elements that are located rearwardly of, and radially within, a restraining element which hits some means for absorbing movement of the restraining element when it is struck by the retaining elements. The means for absorbing the movement of the restraining element acts to absorb the shock of the impact of the restraining element, and normally comprises an insert formed from a deformable plastics material. Such designs, however, are designed for longer bit shanks such as hexagonal shanks, and for larger hammers, and cannot be adapted for shorter bit shanks without the problem of damage due to the rapid deceleration of the bit necessitated by the relatively short shank length.

SUMMARY OF INVENTION

According to the present invention, the restraining element is provided as a pair of separate parts, one of which is an axial restraining block that limits movement of the retaining element in the axial direction and the other of which is a radial restraining element and limits movement of the retaining element in the radial direction, and the axial restraining block can move to a limited extent in the axial direction with respect to the radial restraining element when the retaining element is hit by the rear end of the retaining groove of the bit.

The present invention may be employed in the form of a tool holder that is intended to be attached to, and removable from, a hammer, or alternatively, in the form of a hammer that incorporates a tool holder as an integral part.

The tool holder according to the present invention has the advantage that separation of the impact force exerted on the restraining element by the retaining element into its axial and radial components reduces the magnitude of the maximum force experienced by any individual restraining element, with the consequent reduction in the risk of damage to the tool holder.

Preferably the axial restraining block of the tool holder has a surface that is hit by the or each retaining element and which is substantially normal to the axis of the cylinder, at least in the region thereof that is hit by the or each retaining element, so that the axial restraining block is subject substantially solely to the force in the axial direction required to bring the bit to rest, and not by any radial force in addition. Also, the radial restraining element preferably has a surface that is hit by the or each retaining element and which is substantially parallel to the axis of the cylinder, at least in the region thereof that is hit by the or each retaining element. Such an arrangement can be employed to ensure that each of the restraining elements will be subjected only to either the axial or the radial component of the force acting on the retaining element. In addition, the physical separation of the axially and radially directed forces exerted by the retaining element to separate parts of the retaining element can reduce the wear on the retaining element by the restraining elements, especially in the case of spherical retaining elements.

In a preferred embodiment of the invention, the means for absorbing movement of the restraining element cooperates with the axial restraining block in order to allow it to move by a limited extent in the axial direction, but does not cooperate with the radial restraining element. According to this embodiment, the means for absorbing movement of the restraining element is only subject to the axial impact force of the retaining element. The axial restraining block may be capable of moving up to 5 mm, and preferably by at least 1 mm with respect to the remainder of the tool holder when struck by the retaining element. The axial restraining block is more preferably capable of moving by from 1.5 to 3 mm, and especially by about 2 mm when struck by the retaining element. The arrangement should be such that at least a portion of the impact of the bit on the or each retaining element is absorbed (damped) by axial movement of the axial restraining block, that is to say, that the means that allows the axial restraining block to move axially should not be so stiff that substantially the entire impact of the bit on the or each retaining element is reflected back into the hammer, nor should it be so weak that it is unable to decelerate the axial restraining block until it strikes a more rigid part of the tool holder. Preferably at least 10%, and more preferably at least 30% of the impact of the bit on the or each retaining element is absorbed by axial movement of the axial restraining block.

The design of the SDS Plus type of bit includes a pair of retaining grooves on opposite sides of the bit shank, which enables the tool holder to employ a pair of retaining elements if desired. However, it is preferred for the tool holder to include only a single retaining element. Such a tool holder, which is asymmetric about the axis of the cylinder, has the advantage that the impact of the rear end of the retaining groove of the bit on the retaining element as the bit moves forward, forces the shank of the bit against the internal surface of the cylinder opposite to the retaining element, and thereby aids the deceleration of the bit in the tool holder by frictional engagement with the internal surface of the cylinder.

BRIEF DESCRIPTION OF DRAWINGS

Several forms of tool holder in accordance with the present invention will now be described by way of example with reference to the accompanying drawings in which.

DETAILED DESCRIPTION OF INVENTION

Figure 1:
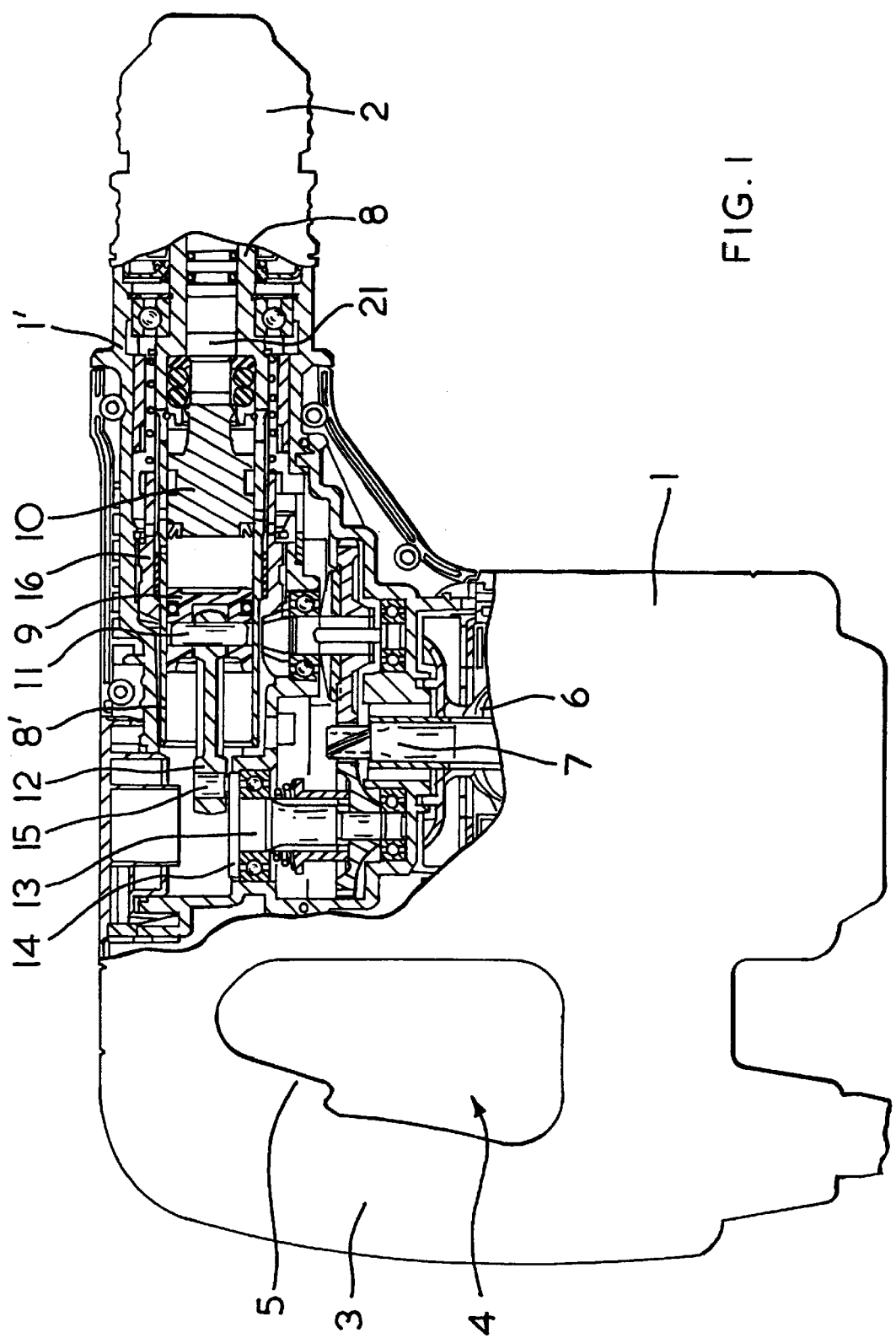
FIG. 1 is a sectional elevation through one form of rotary hammer that may incorporate a tool holder according to the invention.

Referring to the accompanying drawings in which the same reference numerals refer to the same or similar parts, a rotary hammer, described in more detail in WO 98/47670, and in U.S. application Ser. No. 09/060,395, the disclosure of which is incorporated herein by reference, has a hammer housing 1, made up in the usual way of several components, which forms a gripping portion 3 at its rear end, so that a customary switch actuator 5 for switching the electric motor 6 on and off projects into a grip opening 4 which is defined at its rear side by the gripping portion 3. In the rear lower portion of the hammer housing 1, a mains lead which serves to connect the rotary hammer to a power source, is led out.

Located in the upper portion of the rotary hammer in FIG. 1 is an inner housing 1', formed of half-shells and made from cast aluminium or the like, which extends forwards out of the rotary hammer housing 1 and in which a hammer spindle 8 is rotatably housed. The rear end of the spindle 8 forms a guide tube or cylinder 8', provided in known manner with vent apertures, for a pneumatic or air cushion hammer mechanism, and at the front end of which a tool holder 2 is held. The hammer mechanism contains a piston 9 which may be formed from an engineering plastics material such as nylon 4,6 or nylon 6,6 and which may contain a small quantity of polytetrafluoroethylene in order to aid sliding within the cylinder. The piston 9 is coupled, via a trunnion 11 housed in it and a crank arm 12, with a crank pin 15 which sits eccentrically on the upper plate-shaped end 14 of a drive shaft 13. A reciprocating movement of the piston 9 is carried out to alternately create a vacuum and an overpressure in front of it, in order to move the ram 10 situated in the cylinder 8' correspondingly, so that this transmits impacts onto the beat piece 21, which passes them on to the rear end of a hammer bit or chisel bit, not represented, which is inserted into the tool holder 2. This mode of operation and the structure of a pneumatic or air cushion hammer mechanism are, as already mentioned, known per se.

Figure 2:
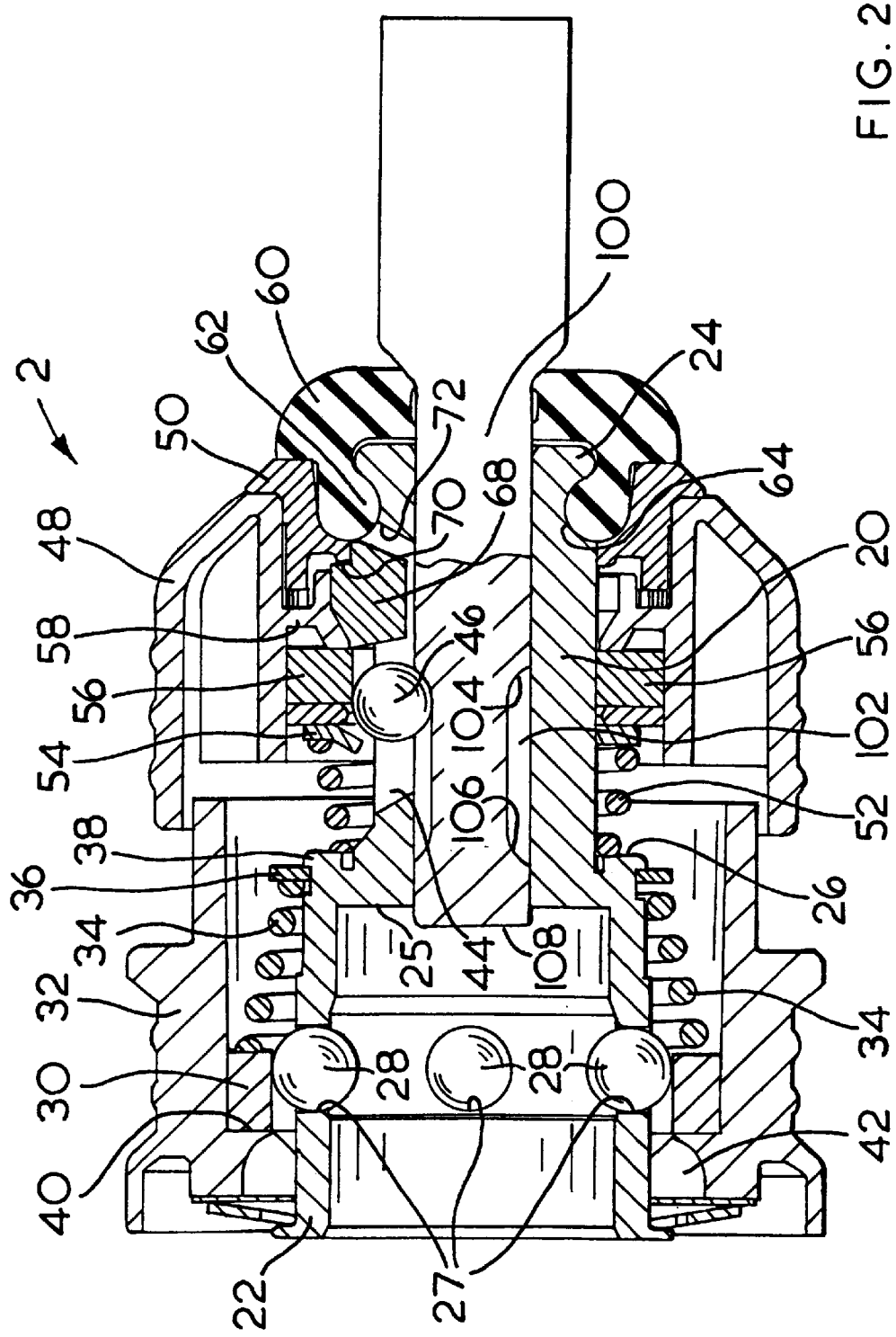
FIG. 2 is a sectional elevation through one form of tool holder according to the invention with a bit inserted therein.

One form of tool holder that may be employed with such a hammer is shown in greater detail in FIG. 2. The tool holder comprises a generally cylindrical body 20 having a rear end part 22 of relatively large diameter that can be located over the end of the hammer spindle 8 of the hammer, and a forward end part 24 of relatively small diameter which has a bore of approximately 10 mm that can receive a 10 mm shank of an SDS Plus hammer bit so that it is able to slide within the bore. The rear end part 22 and the forward end part meet at an intermediate part that defines a rearwardly facing internal shoulder 25 and a forwardly facing external shoulder 26. The rear end part 22 of the cylindrical body 20 has a number of apertures 27, four in this case, each of which receives a ball 28 which can be received in a depression in the hammer spindle 8 for retaining the tool holder on the spindle. The balls 28 are able to move in a radial direction through the apertures 27, but are prevented from moving radially outwardly by means of a locking ring 30 that is movable axially with respect to the cylindrical body 20, and is held within an axially displaceable outer sleeve 32 by means of a compressed helical spring 34. The forward end of the helical spring 34 bears against a ring 36 that is butted against a lip 38 of the cylindrical body, and the rearward end of the spring 34 bears against the axially forward surface of the locking ring 30 to press it against an internal shoulder 40 of the outer sleeve 32. The rearward end of the outer sleeve 32 (behind the internal shoulder) has four recesses 42, each of which is capable of receiving one of the balls 28 to allow it to move radially outwardly to some extent.

In order to attach the tool holder 2 on the spindle 8 of the hammer, the outer sleeve 32 is manually pulled forward with respect to the cylindrical body 20 against the force of the spring 34 so that the locking ring 30 moves forwardly and the recesses 42 become axially aligned with the balls 28. The tool holder can then be slipped over the end of the hammer spindle 8, thereby causing the retaining balls to move radially to some extent into the recesses 42. When the front end of the hammer spindle 8 abuts the internal shoulder 25, the balls 28 will be in axial aligment with recesses in the outer surface of the hammer spindle 8, and the outer sleeve 32 can be released to cause the locking balls to be received by the recesses in the spindle 8 and held in the recesses by the locking ring 30. The tool holder 2 will thus be held on the hammer spindle 8 until the outer sleeve 32 is manually pulled forwardly in order to release the balls 28.

The forward end part 24 of the tool holder has an axial aperture 44 extending therethrough which houses a spherical retaining element 46 referred to as a locking ball so that it can move radially to a limited extent. A forward outer sleeve 48 is disposed around the forward end part of the cylindrical body 20, and is axially displaceable thereto to a limited extent. The forward sleeve 48 is biased in a forward direction against a reaction ring 50 by means of a compressed helical spring 52, the rear end of which bears against the forwardly directed external shoulder 26. The forward end of the helical spring 52 bears against a containing ring 54 which is pressed against the rearward face of an annular restraining element 56, the forward surface of which is pressed against an internal annulus 58 that is formed integrally within the forward outer sleeve 48. The reaction ring 50 is axially slidable along the forward part 24 of the cylindrical body, and is held in position by a nose piece 60 that is formed from a relatively stiff elastomeric material and which has an internal retaining annulus 62 that fits into a correspondingly shaped circumferentially extending recess 64 in the outer surface of the forward end part 24 of the cylindrical body 20. The nose piece 60 has the purpose of protecting the tool holder 2 from any impacts on its front end caused, for example, by the hammer being dropped, and it also fits closely but slidably around the bit shank 100 in order to seal the front end of the tool holder from ingress of dust from the workpiece as the bit slides axially therein.

The internal annulus 58 in the forward outer sleeve 48 is shaped so that its rear end has a smaller diameter than its forward end, and thus the annulus defines a recess 66 in front of its rear end into which the locking ball 46 (or part thereof) may enter when appropriate. The tool holder 2 also includes an axial restraining block 68 that is located within the aperture 44 in the front part 24 of the cylindrical body 20 forward of the locking ball 46, and which extends approximately 120° around the circumference of the cylindrical body. The axial restraining block 68 is located so that it is in axial alignment with the internal annulus 58 (thus obscuring the recess 66 from the locking ball 46), and the front end thereof abuts a rearwardly directed surface 70 of the reaction ring 50. The aperture 44 extends axially so that its front end 72 is approximately 2 mm forward of the front of the axial restraining block 68.

This form of tool holder is intended to receive an SDS Plus bit having a shank 100 that contains a pair of circumferentially opposed, retaining grooves 102 that extend axially for approximately 20 mm and have forward and rearward ends 104 and 106. The bit shank 100 also has a pair of drive grooves (not shown) that extend all the way to the rear end of the shank and which engage drive splines (also not shown) formed in the forward end part 24 of the cylindrical body for rotatably driving the bit.

In use, when the tool holder 2 has been located on the end of the spindle 8 of a hammer, a bit can be inserted in the tool holder simply by manually pushing the bit shank into the bore of the cylindrical body 20. As the bit shank is pushed into the bore, the rear end 108 thereof will engage the locking ball 46 and push it rearwardly against the containing ring 54 and the bias of the helical spring 52. The containing ring 54, or at least that part of the containing ring touching the locking ball 46, is pushed rearwardly until the locking ball can enter a recess formed within the forward outer sleeve 48 just behind the annular restraining element 56, and thus allow the end of the bit shank 100 to move past the locking ball 46. When the retaining groove 102 is in axial alignment with the locking ball 46, it will move forwardly and radially inwardly into the retaining groove under the bias of the spring 52, and thereby lock the bit shank 100 in the tool holder. In this position, the locking ball cannot move radially outwardly to release the bit shank 100 because its radial movement is limited by the annular restraining element 56.

The bit can be removed from the tool holder 2 by manually pulling the forward outer sleeve 48 rearwardly, (i.e. left as shown in the drawing) against the bias of the helical spring 52 so that the annular restraining element 56 is moved to a position rearward of the locking ball 46, and the locking ball is in axial alignment with the recess 66 defined in the internal annulus 58. The locking ball is then able to move radially out of the bore of the cylindrical body into the recess 66 to allow removal of the bit.

When the bit is inserted in the tool holder 2, and the hammer is operated in chiselling mode, the beat piece 21 repeatedly hits the rear end 108 of the bit shank with considerable force in order to cause the bit to chip the workpiece. The engagement of the bit with the workpiece is maintained by the pressure the operator exerts on the hammer toward the workpiece. The reaction force of the workpiece on the bit pushes the bit rearwardly into its working position shown in FIG. 2 in which it is impacted by the beat piece 21.

Figure 3:
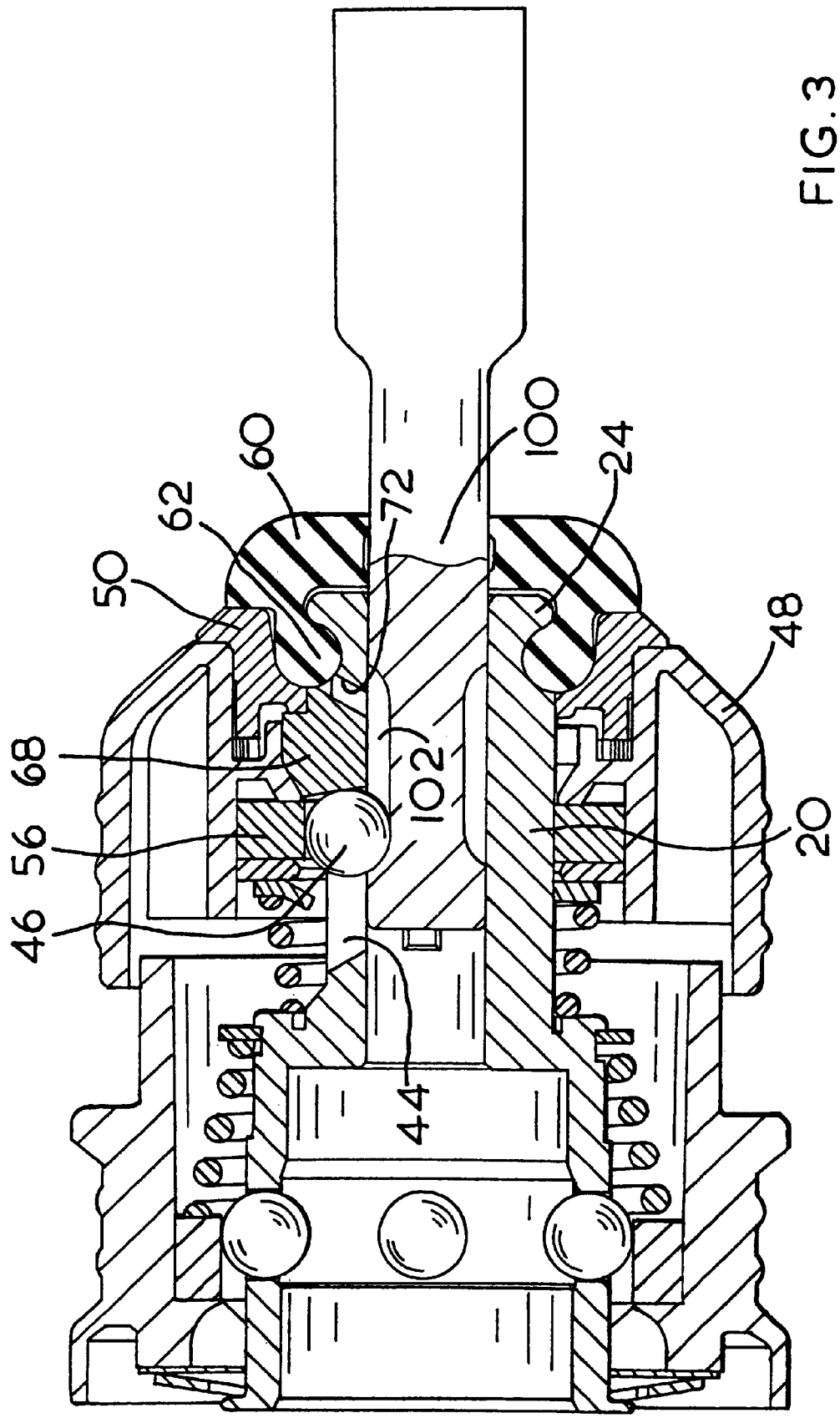
FIG. 3 shows the tool holder of FIG. 2 with the bit in its idle mode position.
Figure 4:
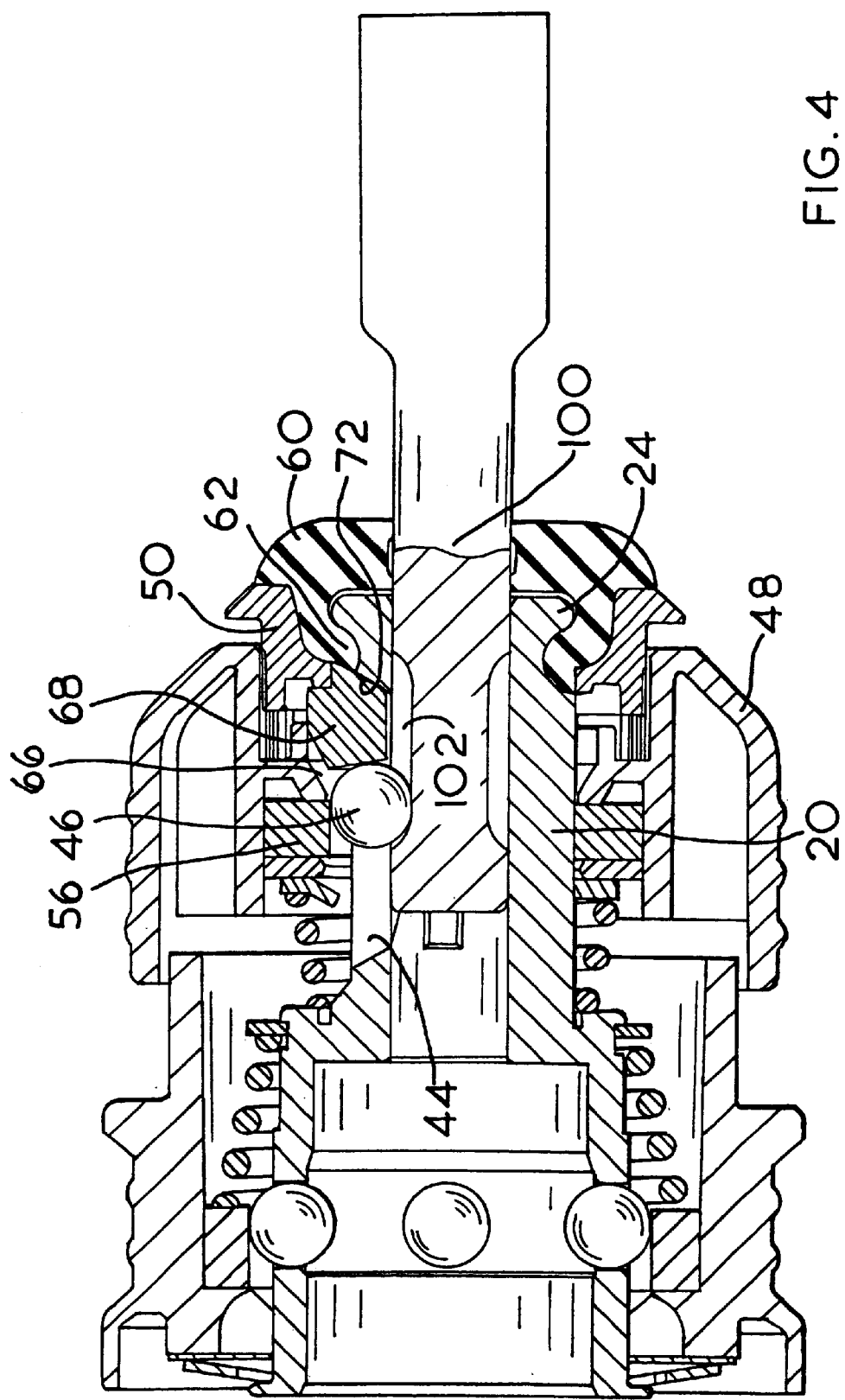
FIG. 4 shows the tool holder of FIGS. 2 and 3 during the first impact of the beat piece after withdrawal of the bit from the workpiece.

When the bit is removed from the workpiece by the operator pulling the hammer back, the next impact of the beat piece on the bit shank 100 throws the bit into its forwardmost or idle position as shown in FIG. 3. Since the bit is no longer engaged in the workpiece, the bit is not pushed rearwardly and so remains in this position until the operator re-engages the workpiece. When the bit is impacted for the last time by the beat piece after withdrawal from the workpiece, this impact, which would have been transferred by the bit to the workpiece, must now be absorbed by the front end of the tool holder. During this impact, the locking ball is thrust both forwardly and radially outwardly due to the depth of the retaining groove 102 in relation to the radius of the locking ball 46. The radially directed force of the locking ball is checked by the annular restraining element 56 whose radially inwardly directed surface bears on the radially outer tip of the locking ball 46, while the axially directed force of the locking ball 46 acts on the rear surface of the axial restraining block 68. As shown in FIG. 4, the axial restraining block 68 is caused to move forward under the impact of the locking ball 46 by up to about 2 mm, during which movement the front end of the reaction ring 50 is caused to deform the internal retaining annulus 62 of the nose piece 60 which thereby absorbs at least some of the impact of the locking ball 46. The nose piece 60 is formed from a stiff elastomer that causes the retaining annulus not only to deform resiliently in order to cushion the shock of the restraining element 68, but also to dampen the shock to some extent in order to absorb it rather than simply reflecting it back to the bit shank 100. The distance of about 2 mm over which the axial restraining block 68 can move before the bit is brought to rest has the effect of reducing the peak axial impact forces on the tool holder, which reduces the wear on the parts of the tool holder and the possibility of damage to it, and reduces the amplitude of the shock wave reflected back on the bit shank from the restraining element, and so reduces the possibility of re-activation of the hammering mechanism. Also, in this case, since only a single locking ball 46 is present, the radial force exerted on the locking ball 46 by the bit shank 100 has the effect of forcing the shank against the opposite side of the cylindrical body 20 which increases deceleration of the bit due to friction against the internal surface of the body. This friction does not cause undue heating since it occurs only on a single impact of the beat piece 21 on the bit shank 100.

Figure 5:
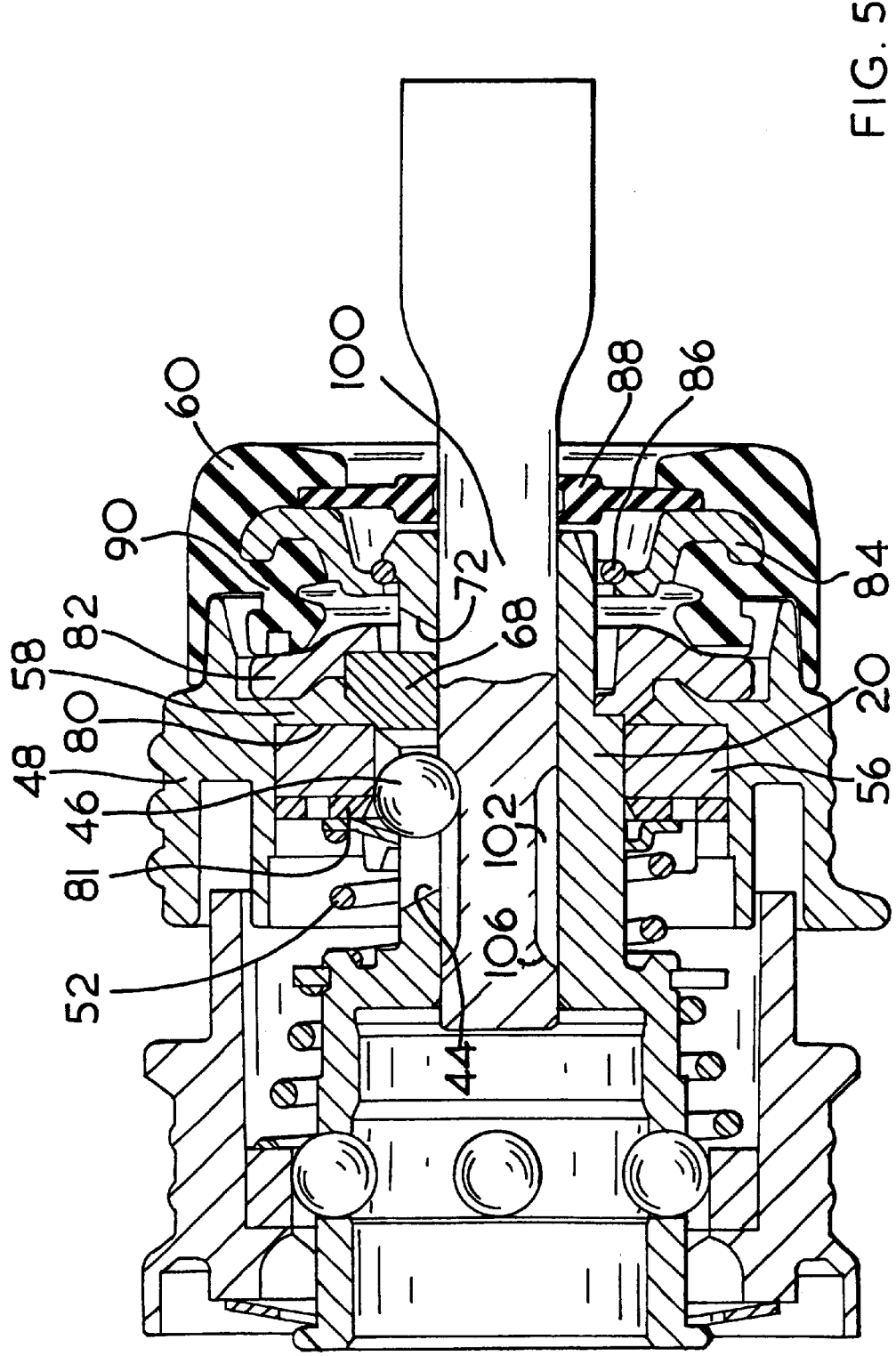
FIG. 5 is a sectional elevation of a second form of tool holder according to the invention with a bit inserted therein.
Figure 6:
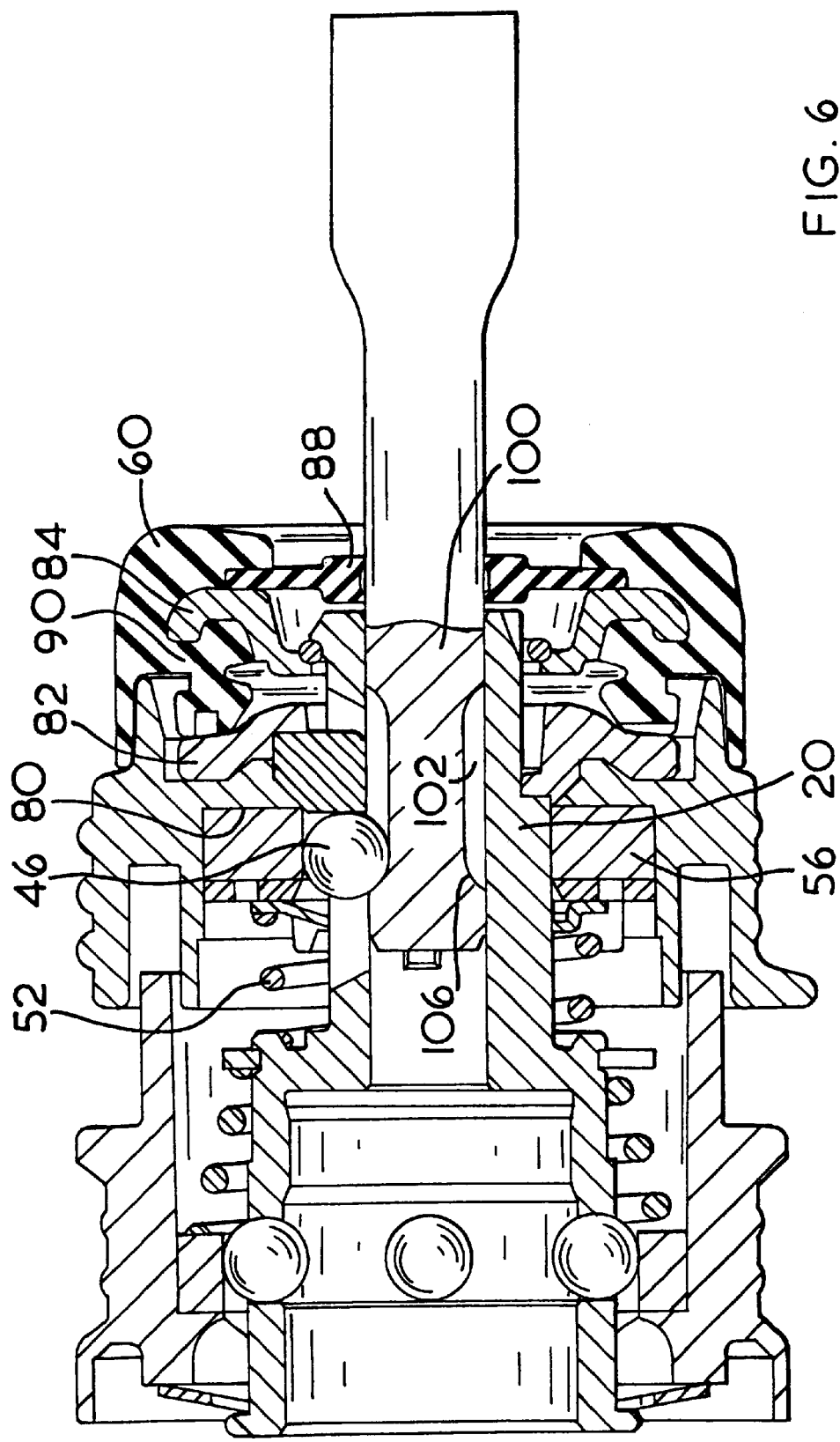
FIG. 6 shows the tool holder of FIG. 5 with the bit in the idle mode position.
Figure 7:
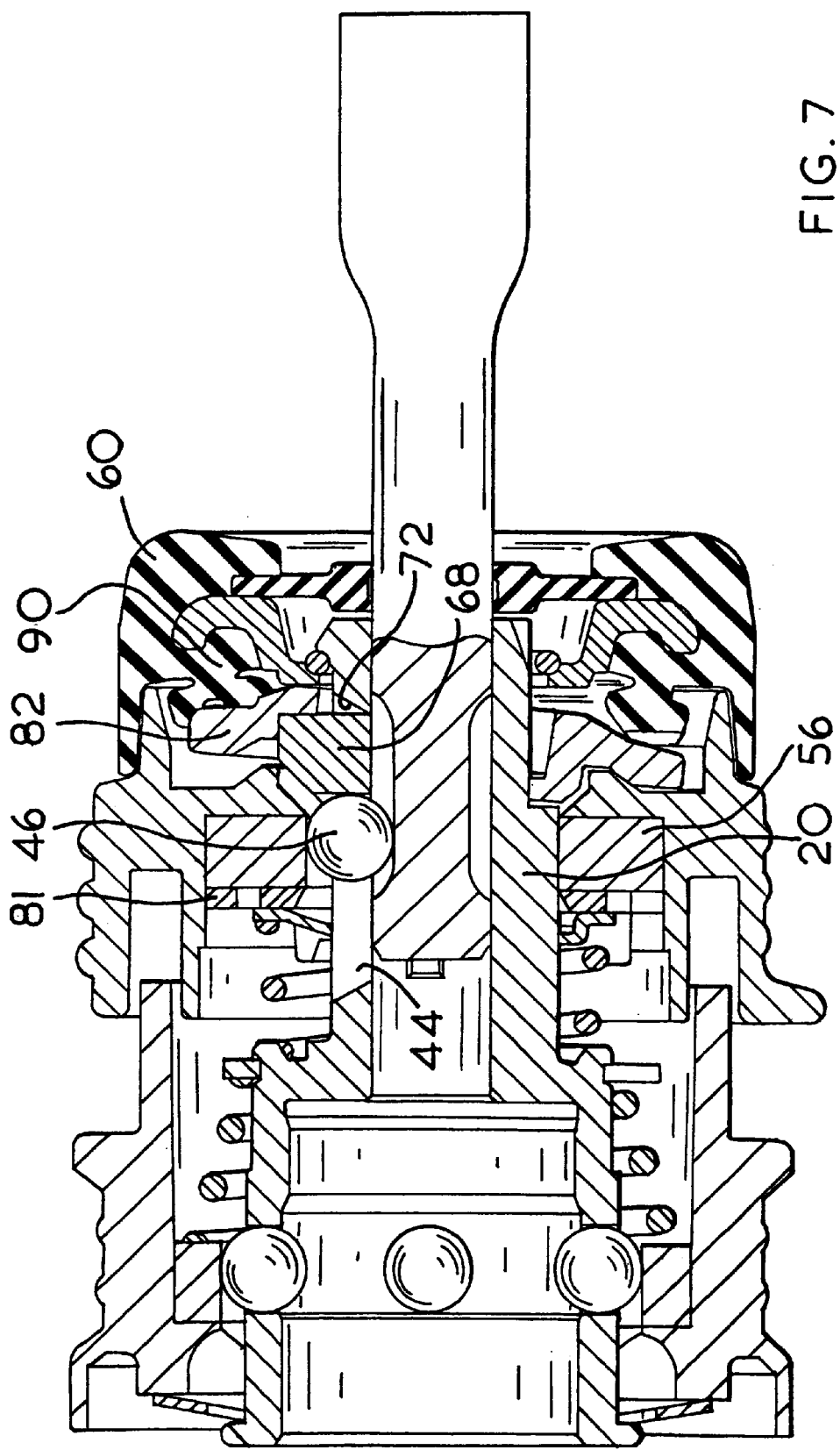
FIG. 7 shows the tool holder of FIGS. 5 and 6 during the first impact of the beat piece after withdrawal of the bit from the workpiece.

A second form of tool holder is shown in FIGS. 5 to 7. This tool holder has a rearward end that is substantially the same as that of the first form of tool holder and which will not be described further.

This form of tool holder has a cylindrical body 20 of the same general form as the other tool holder, and has a forward outer sleeve 48 designed that the internal annulus 58 thereof defines a rearwardly oriented internal shoulder 80 against which the annular restraining element 56 and ring 81 are pushed by the helical spring 52. A metal washer 82 is located directly forwardly of the front of the forward outer sleeve 48 and directly behind the nose piece 60. The rubber nose piece 60 includes a moulded-in-place support washer 84 that is slipped over the front end of the cylindrical body 20 during assembly of the tool holder and held in place by means of snap ring 86 that is snapped over the front of the cylindrical body. A separately formed rubber seal 88 is supported by the nose piece and prevents ingress of dust from the workpiece during use.

When the rear end of the bit shank 100 is impacted after removal of the bit from the workpiece, the rear end 106 of the retaining groove 102 hits the locking ball 46 and the ball is thrust both radially outwardly and axially forwardly as before. The radial force is countered by the annular restraining element 56, while the axial force causes the axial restraining block 68 to move forward in the aperture 44 by about 2 mm, which movement causes the side of the washer 82 adjacent to the locking ball to move forward by the same amount as shown in FIG. 7. The part of the nose piece 60 located between the metal washer 82 and the support washer 84 is formed as an annulus 90 that is relatively thin (in the radial direction) and therefore more easily deformable than the rest of the nose piece 60. Under the effect of the forward movement, of the washer 82, the thin annulus 90 is deformed axially against the support washer 84 which deformation resists further forward movement of the restraining element 68 and absorbs the forward movement of the axial restraining block 68 and the bit 100 as described with reference to the first embodiment.

Figure 8:
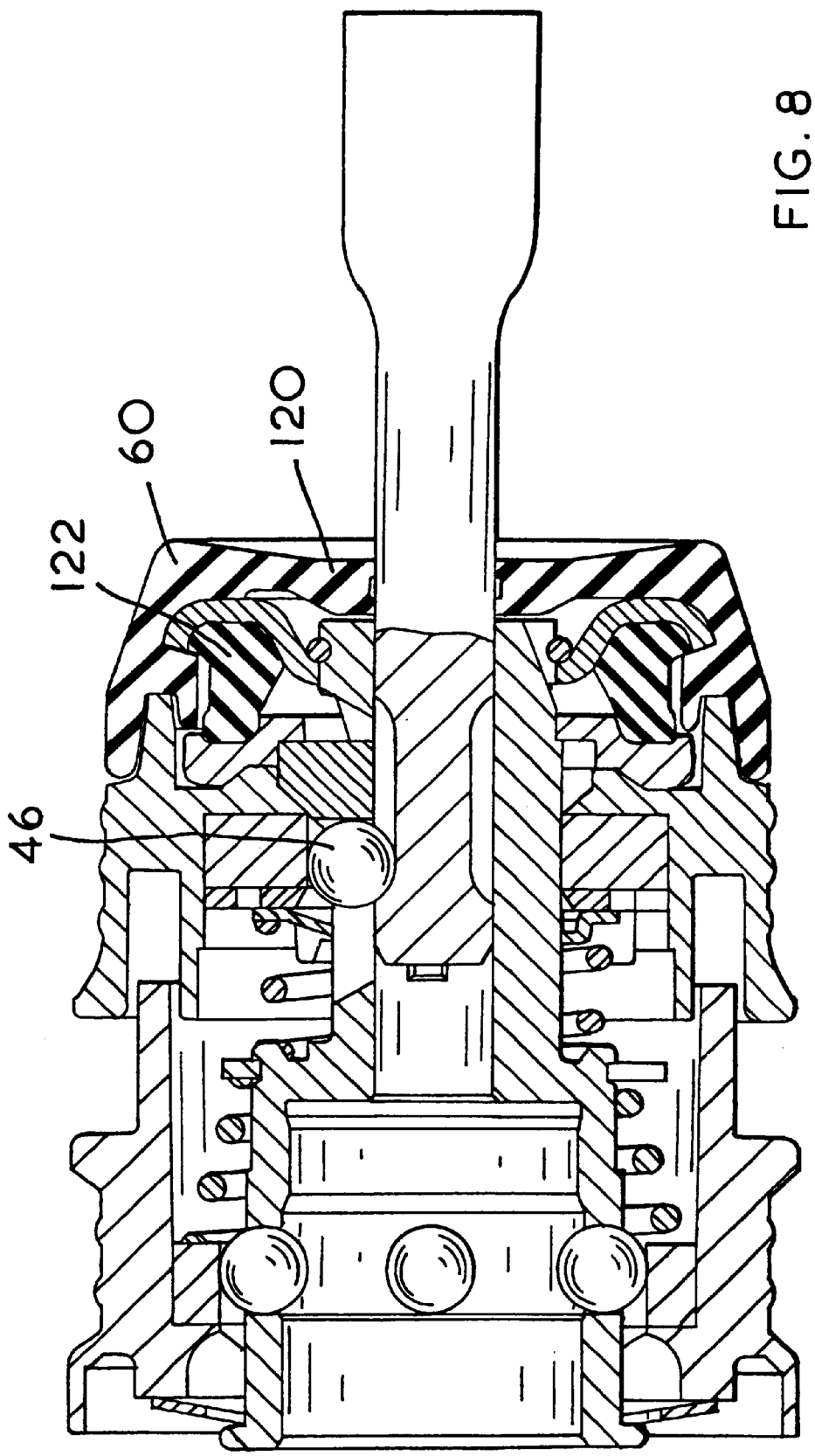
FIG. 8 shows yet another form of tool holder according to the invention.

A third embodiment of the tool holder according to the invention is shown in FIG. 8. This form of tool holder is similar to that shown in FIGS. 5 to 7, but the nose piece 60 includes a deformable seal 120 (corresponding to seal 88) formed integrally therewith. Also, a separate deformable annular element 122 is used to dampen the forward movement of the axial restraining block 68 and washer 82 under impact of the restraining element 46.

What is claimed is:

1. A tool holder attachable to a spindle of a hammer and which can receive a bit, the bit having a shank with at least one retaining groove extending along part of the shank, the retaining groove having a defined length, a front end and a rear end that limit axial movement of the bit in the tool holder, which tool holder comprises:

a hollow cylinder having an axis, an axial bore, a rear end that can be attached to the spindle of the hammer, and a front end that can receive the shank of the bit so that the bit is slidable within the cylinder in an axial direction;

at least one retaining element that is located so that it can extend radially into the bore of the cylinder and into the at least one retaining groove of the bit so that the retaining element can be hit by the rear end of the retaining groove during the transition to idling and limit the extent of axial movement of the bit within the cylinder;

at least one radial restraining element limiting movement of the retaining element in the radial direction;

at least one axial restraining block limiting movement of the retaining element in the axial direction, when hit by the retaining element the axial restraining block movable to a limited extent in the axial direction with respect to the radial restraining element; and a resilient element located forward of the axial restraining block and arranged so as to attenuate the impact transmitted through the axial restraining block from the retaining element.

2. A tool holder as claimed in claim 1, wherein the axial restraining block has a surface that is hit by the retaining element and which is substantially normal to the axis of the cylinder.

3. A tool holder as claimed in claim 1, wherein the radial restraining element has a surface that is hit by the retaining element and which is substantially parallel to the axis of the cylinder.

4. A tool holder as claimed in claim 1, wherein the retaining element is spherical.

5. A tool holder as claimed in claim 1, wherein the resilient element co-operates with the axial restraining block in order to allow it to move by a limited extent in the axial direction, but does not co-operate with the radial restraining element.

6. A tool holder as claimed in claim 1, further including a nose piece, and the resilient element is formed integrally with the nose piece.

7. A tool holder as claimed in claim 1, further including;
a rigid washer slidably mounted around the hollow cylinder and forward of the axial restraining block so as to be hit by the axial restraining block during the transition to idling;
a nose piece with an integral support washer located forward of the rigid washer; and
wherein the resilient element is located between the slidable rigid washer and the integral support washer so as to deform between them when the rigid washer is thrust forward by the axial restraining block.

8. A tool holder as claimed in claim 1, wherein the axial restraining block is capable of moving by up to 5 mm when struck by the retaining element.

9. A tool holder as claimed in claim 1, wherein the axial restraining block is capable of moving by at least 1 mm when struck by the retaining element.

10. A tool holder as claimed in claim 1, wherein the hollow cylinder further includes an aperture, the aperture containing the axial restraining block and the retaining element.

11. A tool holder as claimed in claim 1, wherein the hollow cylinder further includes an internal surface and the impact of the retaining groove of the bit on the retaining element as the bit moves forward forces the shank of the bit against the internal surface of the cylinder opposite to the retaining element.

12. A tool holder as claimed in claim 1, wherein a portion of the impact of the bit on the retaining element is absorbed by axial movement of the axial restraining block.

13. A tool holder attachable to a spindle of a hammer and which can receive a bit, the bit having a shank with at least one retaining groove extending along part of the shank, the retaining groove having a defined length, a front end and a rear end that limit axial movement of the bit in the tool holder, which tool holder comprises:
a hollow cylinder having an axis, an axial bore, a rear end that can be attached to the spindle of the hammer, and a front end that can receive the shank of the bit so that the bit is slidable within the cylinder in an axial direction;
at least one retaining element that is located so that it can extend radially into the bore of the cylinder and into the at least one retaining groove of the bit so that the retaining element can be hit by the rear end of the retaining groove during the transition to idling and limit the extent of axial movement of the bit within the cylinder;
at least one radial restraining element limiting movement of the retaining element in the radial direction;
at least one axial restraining block limiting movement of the retaining element in the axial direction, when hit by the retaining element the axial restraining block movable to a limited extent in the axial direction with respect to the radial restraining element; and
means for absorbing movement of the axial restraining block that is caused by being hit by the retaining element.

14. A hammer which can receive a bit, the bit having a shank with at least one retaining groove extending along part of the shank, the retaining groove having a defined length, a front end and a rear end that limit axial movement of the bit in the hammer, which hammer comprises:
a spindle having a hollow cylindrical portion with an axis, an axial bore, and a front end that can receive the shank of the bit so that the bit is slidable within the cylinder in an axial direction;
at least one retaining element that is located so that it can extend radially into the bore of the cylindrical portion and into the at least one retaining groove of the bit so that the retaining element can be hit by the rear end of the retaining groove during the transition to idling and limit the extent of axial movement of the bit within the cylindrical portion;
at least one radial restraining element limiting movement of the retaining element in the radial direction;
at least one axial restraining block limiting movement of the retaining element in the axial direction, when hit by the retaining element the axial restraining block movable to a limited extent in the axial direction with respect to the radial restraining element; and
a resilient element located forward of the axial restraining block and arranged so as to attenuate the impact transmitted through the axial restraining block from the retaining element.

15. A rotary hammer comprising:
a spindle;
an air cushion hammering mechanism;
a tool bit having a shank with at least one retaining groove extending along part of the shank, the retaining groove having a defined length, a front end and a rear end that limit axial movement of the bit; and
a tool holder including:
a hollow cylinder having a bore, an axis, a rear end that can be attached to the spindle, and a front end that can receive the shank of the bit so that the bit is slidable within the cylinder in an axial direction and so that the shank can be impacted by the air cushion hammering mechanism;
at least one retaining element that is located so that it can extend radially into the bore of the cylinder and into the at least one retaining groove of the bit so that the retaining element can be hit by the rear end of the retaining groove during the transition to idling and limit the extent of axial movement of the bit within the cylinder;
at least one radial restraining element limiting movement of the retaining element in the radial direction;
at least one axial restraining block limiting movement of the retaining element in the axial direction, when hit by the retaining element the axial restraining block movable to a limited extent in the axial direction with respect to the radial restraining element; and
a resilient element located forward of the axial restraining block and arranged so as to attenuate the impact transmitted through the axial restraining block from the retaining element.

* * * * *